(No Model.)

F. O. NILSSON.
CENTRIFUGAL CREAMER.

No. 515,053. Patented Feb. 20, 1894.

Attest

Inventor
F. O. Nilsson
by Richards & Co.
Attys.

THE NATIONAL LITHOGRAPHING COMPANY,
WASHINGTON, D. C.

UNITED STATES PATENT OFFICE.

FRANS OSCAR NILSSON, OF STOCKHOLM, SWEDEN.

CENTRIFUGAL CREAMER.

SPECIFICATION forming part of Letters Patent No. 515,053, dated February 20, 1894.

Application filed September 28, 1891. Serial No. 407,034. (No model.) Patented in Sweden March 12, 1891, No. 3,532; in England September 15, 1891, No. 15,665; in France September 15, 1891, No. 216,152; in Germany September 16, 1891, No. 63,747, and in Norway September 17, 1891, No. 2,444.

*To all whom it may concern:*

Be it known that I, FRANS OSCAR NILSSON, a subject of the King of Sweden and Norway, residing at Stockholm, in the Kingdom of Sweden, have invented certain new and useful Improvements in Centrifugal Creamers, (for which I have obtained patents in Sweden March 12, 1891, No. 3,532; in England September 15, 1891, No. 15,665; in France September 15, 1891, No. 216,152; in Norway September 17, 1891, No. 2,444, and in Germany September 16, 1891, No. 63,747,) of which the following is a specification.

The object of my invention is a centrifugal separator and consists in certain parts and combinations thereof hereinafter more fully described and claimed.

In order to make my invention more clearly understood I have shown in the accompanying drawings means for carrying the same into practical effect.

Figure 1:
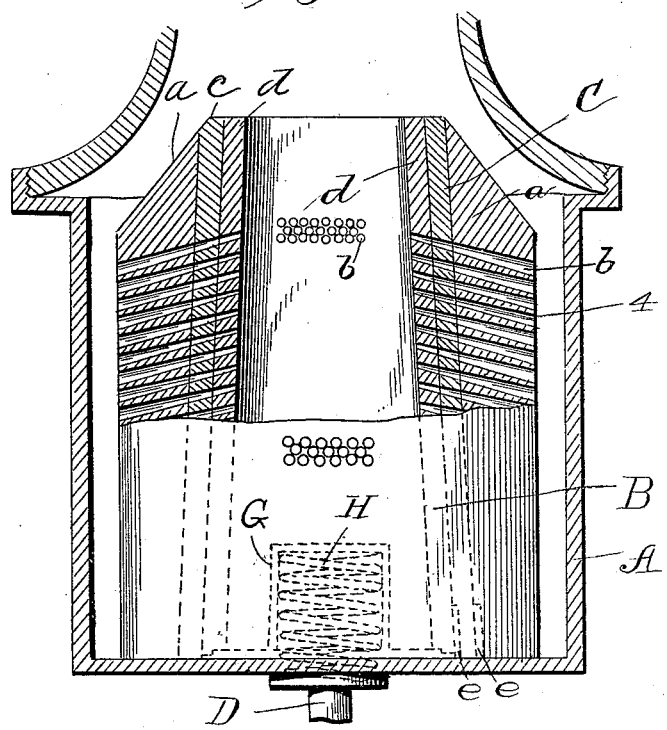
Figure 2:
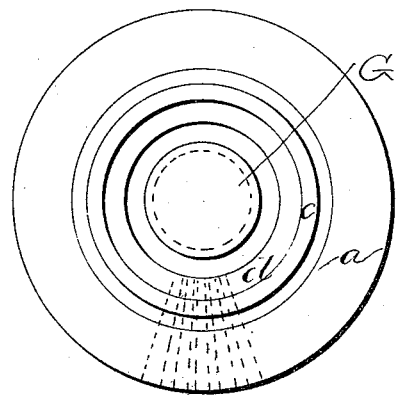

In the drawings, Figure 1— represents the rotary drum with the separator cylinder in place. Fig. 2— is a plan view of the separator cylinder.

The separator comprises an outer drum A and an interior hollow body or cylinder B arranged with a space between them. The drum is carried by a shaft D and rotary motion is thus imparted to the drum and cylinder. The cylinder has a number of channels or holes $b$ running through it from inside to outside and as shown these channels incline downwardly toward the outer side of the cylinder. This is an essential part of my invention, that is, that the channels be formed in the cylinder running in some inclined direction other than radial or perpendicular to the axis of rotation. The milk is introduced into the separator in any suitable manner and when rotated the cream which is lighter flows from the outer parts through the openings to the interior of the cylinder while the skim milk flows outwardly under the influence of centrifugal force, and during this action the cream moves along one wall of the opening, while the skim milk is forced against the other wall of the opening and thus does not conflict in any way with the inward flow of the cream each liquid taking an independent course by reason of the peculiar arrangement of the channels. The cylinder is preferably made of sections $a$, $c$, $d$, in order to facilitate the cleaning of the apparatus and these sections are preferably conical in form in order that one section may fit properly upon another. The liquid may be removed in any suitable way. The sections may be held together by ribs $e$ on one section fitting in a socket in another section. The bottom of the rotary cylinder is provided with a hollow cap G and this contains a spring H adapted to bear on the rotary drum to maintain the cylinder steadily in position.

I claim—

1. In a centrifugal separator, the combination of the rotary drum, a hollow cylinder therein with a space between it and the drum, said cylinder having inclined openings extending through its walls, substantially as described.

2. A centrifugal separator comprising the rotary drum and the cylinder made up of a series of conical sections having perforations therein, adapted to register, substantially as described.

In witness whereof I have hereunto signed my name in the presence of two subscribing witnesses.

FRANS OSCAR NILSSON.

Witnesses:
 AXEL GEORGII,
  *V. Consul,*
 CARL TH. SUNDHOLM.